Jan. 16, 1923.  1,442,445
V. N. ROMANO.
COMPOSITE WOOD AND METAL BEARING.
FILED MAY 13, 1922.
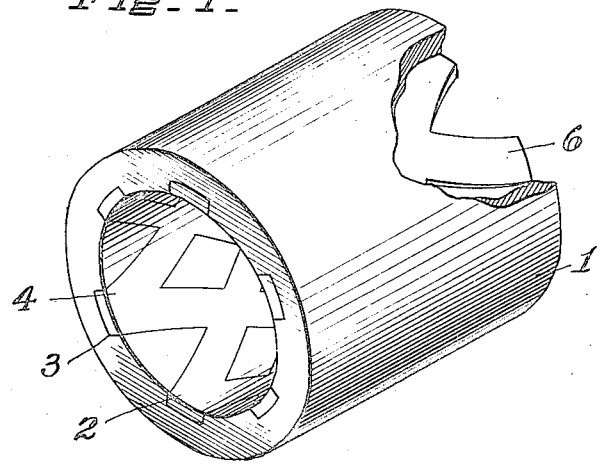
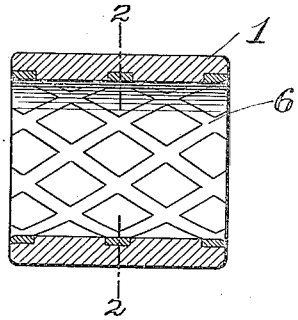
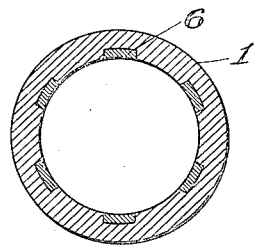
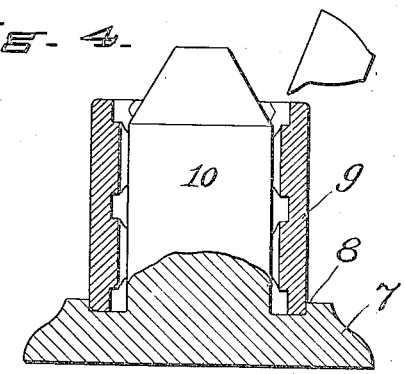
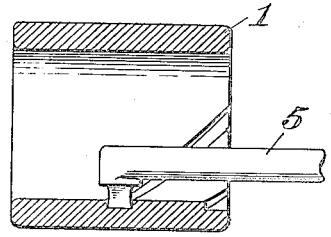
INVENTOR
Vittorio Nicola Romano,
BY
ATTORNEY Patented Jan. 16, 1923.

1,442,445

UNITED STATES PATENT OFFICE.

VITTORIO NICOLA ROMANO, OF MIDDLESEX BOROUGH, NEW JERSEY.

COMPOSITE WOOD AND METAL BEARING.

Application filed May 13, 1922. Serial No. 560,564.

*To all whom it may concern:*

Be it known that I, VITTORIO NICOLA ROMANO, a citizen of the United States, and a resident of the borough of Middlesex, in the county of Middlesex and State of New Jersey, have invented certain new and useful Improvements in Composite Wood and Metal Bearings, of which the following is a full, clear, and exact description, whereby anyone skilled in the art may make and use the same.

The invention relates to self lubricating type of bearing and I have termed this a composite wood and metal bearing, inasmuch as I have employed wood and other fibrous materials in conjunction with a metal for giving a bearing surface.

Self lubricating bearings are well known in the art and include such forms as a cast metal shell with grooves or indentations or pockets, interiorly formed therein, which pockets, or the like, are filled with graphite lubricating compound. They also include metallic shells having rolled and indented pockets, the shell being rolled up to form a split type of bearing with a graphite compound filling the indentations.

In either of these types of bearings the only lubricating quality results from the graphite compound which is wiped over each elemental line of the metallic bearing surface and thus reduces friction.

It is the object of the present invention to provide for lubrication in conjunction with the inserted material so that there will be a real grease lubricant that will exude and form a perfect lubrication for bearing surfaces and shaft as soon as any friction develops which will give a very moderate heat.

Bearings made as is hereinafter described, may be formed with thick or thin walls at a very moderate expense. Furthermore, they may be made to very exact dimensions. While it is practically commercially impossible to produce thin wall metal bearings by casting, it is quite feasible to turn out thin wall fibrous bearings, such as wood, to a great exactitude of dimensions. As such bearings are cut with tools of accurate dimensions, I find no difficulty in filling the same with an alloy metal.

In fact, it is one of the principal objects of the present invention to cast into such a bearing what is, in effect, a cage of metal. This metal is of the lubricating type, that is, a form of "Babbitt" metal or lead copper alloy, or in fact, any of the so called "greasy metals."

Referring to the drawings:

Fig. 1, is a perspective view of a bearing with parts broken away to show the construction.

Fig. 2, is a longitudinal section through the bearing.

Fig. 3, is a cross section on the line 2—2 of Figure 2.

Fig. 4, is a partially vertical section illustrating a method of pouring the metallic cage.

Fig. 5, illustrates a means of providing the pattern grooves for the metallic cage.

Inasmuch as wood or fibre may be tooled into any desired form, and then saturated with a suitable lubricant, it forms an admirable container for the cast in cage of "greasy metal."

Grooves may be formed in any desired manner in the interior of cylindrical fibrous bearing so that the elemental circumferential lines of the bearing or the shaft are wiped across the saturated wood or fibre portions of the bearing and the metallic cage.

There is a particular advantage in this fibre and metal cage arrangement, even where the bearing is applied to shafts which are normally well lubricated. In the event of the lubrication failing, the saturated wood or fibre will always provide adequate lubricant to prevent heating or scoring of the shaft. There is no liability of the "Babbitt" or "greasy metal" becoming heated to the melting point, so that it will run out of the bearing.

With the ordinary form of bronze bearing, with a "Babbitt" or "greasy metal" lining, it frequently happens that failure of lubrication causes heating, and as a result, the "babbitt" runs out of the bearing. As a result, the shaft will drop down upon the bronze casing throwing it out of line and ultimately causing scarring of the shaft.

In the accompanying drawings, there is illustrated one form of cage applicable to wood or fibrous bearings.

As illustrated, the numeral 1, denotes a shell of wood finished to dimensions as to its exterior, and having intersecting spiral grooves formed from end to end thereof, one set of grooves, as indicated at 2, may be considered right hand spirals, the second set of grooves, indicated at 3, may be considered as reverse, or left hand spirals.

The spiral form of groove is illustrated merely because it indicates an efficient arrangement. Where the spiral groove or some other form of groove is used, it will be observed that the intersection of the grooves provides a continuous series of channels, all interconnected to receive the metal cage 4, when it is cast therein.

This particular form of groove is not absolutely essential and may be modified to suit the exigencies of any particular requirement, in fact, if desired, the grooves may be undercut so that the width of the groove at the bearing surface is somewhat narrower than at the base of the groove. Such an arrangement insures locking of the metal cage and the exterior fibrous or wood shell.

In carrying out the invention, I first form a tubular wood bearing in the usual wood working machine, cutting the exterior to approximate dimensions, and boring the interior to concentric approximate dimensions.

With a suitable tool 5, as illustrated in one form, in Figure 5, the grooves are then cut from end to end of the shell. When these are cut in reverse spirals, as indicated in Figures 1 to 4, of the drawings, there are intersecting grooves in which it is possible to cast a metallic cage 6.

As illustrated in Figure 4, any suitable form of mold may be employed and for illustration, upon a base 7, having a groove 8, to receive the shell 9, may be a central plug or core 10, to determine the depth and thickness of the cast in metal.

With the shell in place, a metal is poured from a ladle, or any convenient apparatus to fill the grooves of the interior of the shell.

The shell, thus provided with an interior metallic cage 6, is submitted to a saturating bath of paraffins, oils, tallows and waxes and boiled until the fibre or wood is completely saturated. When a wood shell is used the saturation step generally is best carried out before the grooves are cut and prior to forming the metallic cage.

In either case it is preferred to use a combination of elements in the saturating bath, having a comparatively high melting point. For instance, some 260° F.

With such a melting point, it is obvious that the bearings will withstand all ordinary frictional heats, and in fact, there will be little frictional heat. This is due to the fact that the moment heat develops, the saturated fibre will deliver a film of lubricant which will immediately reduce the frictional coefficient between the shaft and bearing. There can, therefore, be no further rise in temperature.

It will be obvious that the saturated fibre will deliver adequate lubrication to the metallic cage to insure its running cool on the shaft.

If, from any unusual cause, the metallic cage should break down under heat conditions, there is still a good bearing surface provided by the saturated wood or fibre, and a sufficient one to prevent scoring of the shaft.

Obviously, the form of groove, thickness of wall of the fibre shell and comparative proportions of metal or wood or fibre, at the bearing surface, may be modified to suit the exigencies of any particular requirement.

The main purpose in providing a bearing such as above described, is to secure a metallic cage forming a direct bearing surface intimately united with a saturated fibre or wood shell which will provide adequate lubrication between the metal cage and its shaft.

After the bearings have been completely saturated in the lubricating bath, they may be brought to very accurate dimensions by turning and reaming. The saturated wood or fibre, in the operation of boring or reaming, provides a lubrication for the tool which prevents any "dragging" of the comparatively soft metallic cage, whether it be formed of "babbitt" or any of the lead alloys. Most of these metals are subject to drag or tear under the action of tools, but when backed up by a saturated lubricating fibre, they may be turned to extremely accurate dimensions.

What I claim as my invention and desire to secure by Letters Patent is:

1. A bearing comprising a shell structure impregnated with a lubricant, and an interior metallic cage, said impregnated shell and metallic cage forming a self-lubricating bearing surface.

2. A bearing comprising a wood or fibrous shell, longitudinally extending grooves formed interiorly thereof, and a metallic cage cast into said grooves, said shell being impregnated with a lubricant.

3. A bearing comprising a lubricating fibrous shell and an interior metallic cage intimately united with the interior surface of the fibrous shell and metallic cage forming a bearing surface.

4. A bearing comprising a wood or fibrous shell impregnated with a lubricant, spiral grooves extending from end to end of the shell in opposite directions and intersecting to provide a holding pattern for an insert and an insert consisting of metal cast into said grooves and forming a metallic cage interiorly of the shell, said cage and shell forming lubricating bearing surfaces.

5. A method of producing a composite bearing which consists in forming a wood or fibrous shell of tubular form, saturating said shell with a lubricant, scoring the interior of said shell to provide casting pockets, casting a metal cage within the shell and filling the pockets, and boring, reaming or turning the shell and metallic cage to required dimensions.

6. The method of producing a self-lubricating bearing which comprises forming a rim shaped structure, saturating said structure with a lubricant, forming grooves in the surface of said structure, filling said grooves with a metal, and shaping the surface of said structure and metal to the desired dimensions to form bearing surfaces.

VITTORIO NICOLA ROMANO.

Witnesses:
GEORGE W. HARRIS,
ANTONIO MUTRUNO.